O. A. MYGATT.
GLASS STRUCTURE.
APPLICATION FILED MAY 13, 1907. RENEWED FEB. 5, 1912.

1,041,329.  
Patented Oct. 15, 1912.

WITNESSES  
Chas. K. Davies.  
Margaret Smith.

INVENTOR  
Otis A. Mygatt  
by Bartlett & Brock.  
Attorneys

UNITED STATES PATENT OFFICE.

OTIS A. MYGATT, OF NEW YORK, N. Y.

GLASS STRUCTURE.

1,041,329. Specification of Letters Patent. Patented Oct. 15, 1912.

Application filed May 13, 1907, Serial No. 373,330. Renewed February 5, 1912. Serial No. 675,647.

*To all whom it may concern:*

Be it known that I, OTIS A. MYGATT, a citizen of the United States, residing at New York, in the State of New York, have invented new and useful Improvements in Glass Structures, of which the following is a specification.

My invention relates to a new structure of glass for use generally in the arts. This new glass structure is adapted to a wide variety of uses all of which cannot, obviously, be set forth in this specification. As illustrative of some of its uses, however, may be mentioned glassware, table ware, decorative ware, jars, and the like. It should be clearly understood that the invention relates broadly to any kind of glassware used in the industrial arts, the fine arts, or the decorative arts.

The new glass structure consists of a body of transparent glass having upon one side a stratum of color and, upon the opposite side, lens-like conformations. The light effect upon such a glass structure as viewed through the lens-like side are entirely new in the art. When the color-stratum is substantially white, soft satin-like effects are produced. By changing the arrangement of the lens formations watered-silk designs are formed. When the stratum is a combination color-scheme the effect as viewed through the lens-like side is artistically beautiful; some of these effects being, for instance, like mother-of-pearl.

As the color-scheme of the color-stratum side may be indefinitely varied, so also may be the beautiful effects produced through the lens-like formations on the other side of the transparent body, be varied.

One or two forms of my structure, sufficient to illustrate my invention, will be here set forth.

Figure 1:
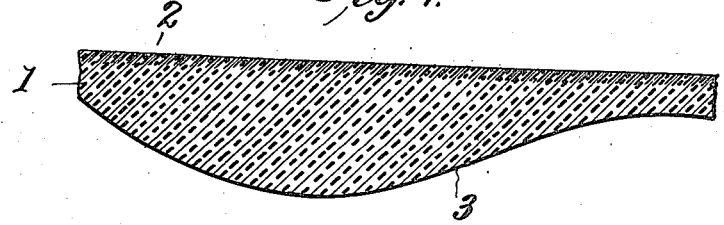
Figure 2:
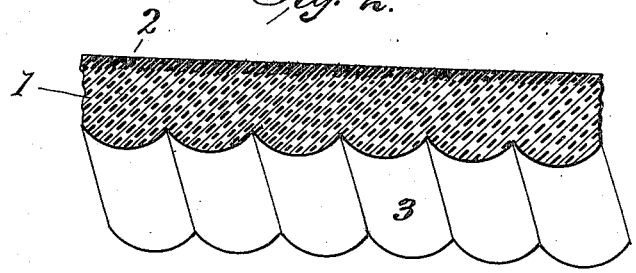
Figure 3:
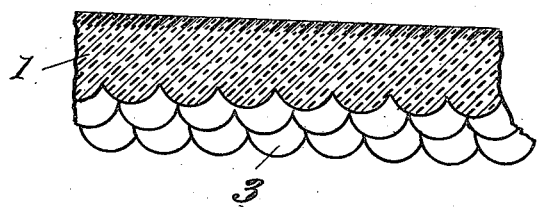
Figure 4:
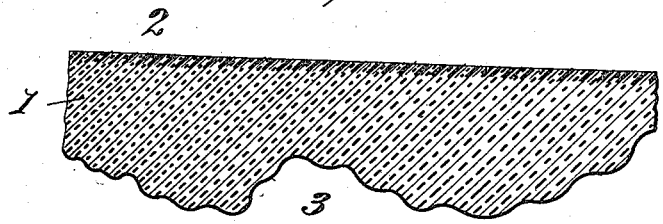

Figure 1 represents a section through a portion of glass structure showing a transparent body 1, having a stratum of color 2 on one side and a lens-like surface 3 formed by giving the surface a compound curve. Fig. 2 is a similar view showing the lens-like side formed of a series of convex curves. Fig. 3 represents still another view in which the lens-like side 3 is fashioned in a series of lenticular protuberances. Fig. 4 is another modified form.

Many other specific forms of lens-like conformations could be obviously illustrated, but the above examples will doubtless be considered sufficient to illustrate the invention.

The color-stratum side of the glass structure may be straight, curved, zig-zag, or otherwise irregularly disposed. The color-stratum is preferably a paint or enamel.

Among the finest artistic and decorative effects ever obtained in glass structure are successfully produced by my invention.

Fig. 4 shows the lens-like side irregularly formed, and the body of the glass varying in thickness.

Light rays passing through the lens-like formations or lenticula are magnified and focused in part in varying ways against the color-stratum and reflected back through the lens-like surface. Viewed from different positions a particular glass structure correspondingly varies in aspect and design.

In these glass structures the varying thickness of the glass, in connection with the lens-like surfaces, modifies the magnifying, focusing and reflecting effects in more or less degree in the production of the decorative designs.

This glass structure may be given various shapes, such as polygonal, or annular, and the surface may be plane or curved, dished, pyramidal, conical, or the like.

I claim:

1. A transparent glass body having a lens-like curved surface on one side and upon the opposite surface a colored backing integral therewith.

2. A transparent glass body varying in thickness having a lens-like curved surface on one side and upon the opposite side a colored backing integral therewith.

OTIS A. MYGATT.

Witnesses:
ROBERT KELLY, Jr.,
C. L. MATTHEWS.